US006415202B1

(12) United States Patent
Halfacre

(10) Patent No.: US 6,415,202 B1
(45) **Date of Patent: *Jul. 2, 2002**

(54) TAMPER RESISTANT PROGRAMMABLE MEDICINE DISPENSER

(76) Inventor: Van Halfacre, 307 N. Davis St., Manila, AR (US) 72442

( * ) Notice: Subject to any disclaimer, the term of this patent is extended or adjusted under 35 U.S.C. 154(b) by 0 days.

This patent is subject to a terminal disclaimer.

(21) Appl. No.: 09/572,698

(22) Filed: May 16, 2000

Related U.S. Application Data

(63) Continuation-in-part of application No. 09/100,465, filed on Jun. 19, 1998.

(51) Int. Cl.[7] .................................................. G06F 17/00

(52) U.S. Cl. ........................ 700/232; 700/231; 700/236; 700/242; 700/243; 221/4; 221/8; 221/15; 221/17; 221/83; 221/86; 221/89; 221/102; 221/119; 221/185; 221/247; 221/258

(58) Field of Search ................................. 700/232, 231, 700/236, 242, 243; 221/8, 4, 5, 17, 15, 18, 19, 89, 82, 86, 185, 258, 119, 247, 248, 83, 102

(56) References Cited

U.S. PATENT DOCUMENTS

| | | | | | |
|---|---|---|---|---|---|
| 3,822,031 | A | * | 7/1974 | Sterling et al. | 221/10 |
| 4,207,992 | A | | 6/1980 | Brown | |
| 4,310,103 | A | * | 1/1982 | Reilley, Jr. et al. | |
| 4,621,746 | A | * | 11/1986 | Reichle et al. | 221/76 |
| 4,838,453 | A | * | 6/1989 | Luckstead | 221/2 |
| 4,911,327 | A | | 3/1990 | Shepherd et al. | |
| 5,097,982 | A | * | 3/1992 | Kedem et al. | 221/3 |
| 5,176,285 | A | | 1/1993 | Shaw | |
| 5,323,929 | A | | 6/1994 | Marlar | |
| 5,363,973 | A | * | 11/1994 | Sieg | 211/41 |
| 5,397,017 | A | * | 3/1995 | Muza et al. | 221/91 |
| 5,412,372 | A | | 5/1995 | Parkhurst et al. | |
| 5,438,523 | A | * | 8/1995 | Humm et al. | 364/479.13 |
| 5,441,165 | A | * | 8/1995 | Kemp et al. | 221/2 |
| 5,609,268 | A | | 3/1997 | Shaw | |
| 6,163,736 | A | * | 12/2000 | Halfacre | 700/232 |

* cited by examiner

*Primary Examiner*—Christopher P. Ellis
*Assistant Examiner*—Jeffrey A. Shapiro
(74) *Attorney, Agent, or Firm*—Dowell & Dowell, P.C.

(57) ABSTRACT

A portable electrically operable and tamper resistant medication dispenser for supplying multiple daily medications to a patient on a predetermined schedule and which includes a programmable assembly for indexing a plurality of containers which are filled with the medications to a dispenser outlet.

20 Claims, 6 Drawing Sheets

TAMPER RESISTANT PROGRAMMABLE MEDICINE DISPENSER

CROSS REFERENCE TO RELATED APPLICATIONS

This application is a continuation-in-part of application Ser. No. 09/100,465, filed Jun. 19, 1998, entitle TAMPER RESISTANT PROGRAMMABLE MEDICINE DISPENSER in the name of the same inventor.

BACKGROUND OF THE INVENTION

1. Field of the Invention

This invention is generally directed to automated medication dispensers which are programmable to make medication available to patients on a predetermined schedule over an extended period of time and, more specifically, to such dispensers which include a plurality of containers containing medicine to be taken and which containers are carried by an indexing assembly so as to be moved relative to a dispenser outlet on a predetermined schedule. The invention is further directed to dispensers which are portable and electrically operated and which may include a battery backup system for insuring fail-safe operation during a loss of conventional power. The dispensers further include tamper-resistant mechanisms for preventing unauthorized movement of the indexing assembler to prevent untimely access to medications.

2. History of the Related Art

There are many patients who must take one or more medications over a period of time. Frequently, patients will require multiple dosages of different medicines in a single day with the medications being required at predetermined time intervals. To be effective, many medications must be taken at predetermined times over a period of days, weeks or longer. Therefore, it is extremely important to the health and welfare of patients that they follow their medication schedule to insure the optimum benefit to be obtained from their medication.

In clinics and hospitals, doctors and nurses maintain timing schedules for patients and must take steps to insure that each patient receives the proper medication at the proper times. Such a labor intensive system for insuring that patients take their required medication at the proper time greatly affects the cost of providing medical care. There are, of course, circumstances wherein patients may not be capable of taking medication at proper times and thus require direct assistance. However, there are many instances, both in clinic and hospital environments as well as where patients are receiving medication on an out-treatment basis, where patients have the physical ability to take a medication if they are aware that a medicinal dosage is required at a specific time.

Over the years, there have been many dispensers designed to facilitate the proper administration of medicine to patients who require that medications be taken at specific times over a prolonged period. Basic dispensers included containers having a plurality of separate receptacles for receiving predetermined medications. For example, a container may include seven receptacles each representing a day of the week. Medication is placed within the receptacles with each receptacle being marked with a day of the week. The patient is directed to take the prescribed medicine from the proper receptacle on a predetermined schedule.

Such prior art mechanical dispensers which require that the patient take medications on a prescribed basis have not proven to be satisfactory. Often, patients forget to take their medication or to take their medication in a timely manner. Such failure to take medication when due not only results in the ineffective administration of the medication, but frequently patients will attempt to make up for missed dosages by taking several dosages at a later time which can be hazardous to the patient's health.

To prevent patients from taking missed dosages at a later time, some prior art dispensers have been designed to incorporate motors or drive mechanisms for indexing a receptacle or compartments in which medications are contained away from a dispensing outlet. Such dispensers are operable to move a compartment in alignment with a dispensing outlet only at a predetermined time. If a medication has not been removed from the dispenser within a predetermined time, the medication is moved from the dispensing outlet. Unfortunately, many prior art dispensers can be easily tampered with, thereby allowing a patient to obtain access to medicines which should not be taken.

To alert patients that medication is required, some prior art dispensers have been designed to incorporate audible or visual signal devices for indicating a time for a medicine to be taken. For instance, such dispensers may incorporate a buzzer which sounds for a period of time to alert a patient that medication is required. Such signaling devices are more effective in assuring that a patient follows a predetermined medication schedule, however such devices do not prevent a patient from doubling up on dosages which have been missed for one reason or another.

Some examples of prior art medication dispensers which provide for alarms or signals and which are designed for dispensing medication over a period of time and which also include programmable timers include U.S. Pat. No. 4,207,992 to Brown, U.S. Pat. No. 4,911,327 to Shepherd et. al., U.S. Pat. No. 5,176,285 to Shaw, U.S. Pat. No. 5,323,929 to Marlar, U.S. Pat. No. 5,412,372 to Parkhurst et. al., and U.S. Pat. No. 5,609,268 to Shaw.

SUMMARY OF THE INVENTION

The present invention is directed to a portable and tamper resistant electronically operated medication dispenser which incorporates a programmable timer and drive assembly for selectively indexing a plurality of separate containers relative to a dispenser outlet. In the preferred embodiment, the present invention includes a portable carrying case which may be locked to prevent access to the interior. Within the carrying case is an indexing drive wheel and a dispenser wheel having a plurality of vertically aligned and spaced openings therein, each being of a size to selectively receive a container. In the preferred embodiment, there are two circular series of openings in each wheel. The containers are configured to receive required dosages of medicine which a patient must take and which are normally filled by competent medical technicians, such as physicians or nurses. The indexing drive wheel and dispenser wheel are designed to permit controlled dispensing of medications over a period of a week with a separate section of the wheels being available to contain or support medication for an additional day in the event of an emergency. Further, in the preferred embodiment, a plurality of openings are provided for each day so that containers of medication may be indexed in a timely manner at up to six or more intervals during a given day. Utilizing the controller associated with the invention, the indexing wheel and dispenser wheel can be selectively moved so that doses of medicine are supplied at varied intervals for each day of the week the dispenser is in use.

The movement of the ratchet wheel of the present invention is accomplished by a motor connected to a rotary indexing drive mechanism which includes at least two driver pins which are offset to the rotary drive axis of the drive mechanism. The pins are spaced such that when one or a first pin seats within one of a plurality of equally spaced slots which are formed in the outer periphery of the drive wheel and the indexing drive mechanism is not activated, the other or second pin is spaced from the periphery of the drive wheel with the drive wheel being locked from rotation by the first pin. Upon activation of the motor, the drive mechanism rotates 180°. During this rotation, the first pin moves the drive wheel about its axis of rotation as the second pin enters the next slot in the periphery of the drive wheel. In this manner, the dispenser wheel is indexed one position such that the next opening for a medicine container is moved into alignment with the dispenser outlet.

Mounted within the dispenser adjacent to the dispenser opening are first and second switches which are engageable by containers which are being indexed into alignment with the dispenser outlet. The switches are electrically connected to sound an audible alarm that sounds when a container moves into alignment with the dispenser opening. In some embodiments, a timer in the main control assembly will cause the alarm to sound for a predetermined period. The container contact switches adjacent the dispenser outlet are also connected to activate a visual signal such as a light on the dispenser case. Upon removal of the container by a patient, the container contact switches are opened and the light and sound deactivated. Therefore, with the present invention, a visual and or sound signal that medication is required remains as long as a medication container is aligned with the dispenser outlet.

Access to a container which has been moved into alignment with the dispenser outlet is controlled by a automatically controlled closure member which is pivotally mounted to move from a first position closing the outlet to a second position opening the outlet whenever a medication container is in one of the inner or outer series of openings. The closure member is connected to a crank arm assembly driven by a motor. The crank assembly is connected to a double cam which controls a pair of switches to terminate power to the motor after the crank assembly has moved the closure member to an open or closed position. The operation of the closure control motor is in response to a container contacting one of the container contact switches. Once the closure member is moved to the open position, all power to the motor is stopped for a predetermined period of time to allow a patient to remove a medication container. Thereafter, the control unit reactivates the motor and the crank assembly moves the closure member to the closed position. A slot is provided in one arm of the crank assembly to prevent closure of the closure member by allowing relative movement in the components of the crank assembly in the event a person's fingers or other obstructions is within the outlet when the closure member is being closed. A spring or other resilient element connected to the closure member will complete the closing movement of the closure member once the obstruction has been removed. Once the closure member reaches the fully closed position, the slotted arm of the crank assembly drops down off a ledge on an upper cam driven by the motor, locking it into the closed position, preventing the closure member from being pried open.

The drive wheel indexing assembly further functions as a brake mechanism which restricts movement of the drive wheel such that a patient cannot move the dispenser wheel and obtain access to medication with exception of those medications which are contained within a container aligned with the dispenser outlet.

The present invention further incorporates a rechargeable battery which will permit operation of the dispenser in the event of a power failure or when there is no AC power source. The carrying case is also designed to store containers which are to be used.

It is a primary object of the present invention to provide a portable electrically operated medication dispenser which prevents unauthorized access to medication contained therein and which incorporates a mechanism for resisting tampering with the normal operation of the dispenser such that medication cannot be obtained by a patient or other individual until the medication is aligned with a dispenser outlet at a predetermined time.

It is also an object of the present invention to provide a medication dispenser which is portable and which is designed to allow its use with a conventional source of electrical power such as an AC power source but which is also capable of functioning in the event of loss of AC power by power from a rechargeable battery.

It is yet another object of the present invention to provide a medication dispenser which permits the controlled dispensing of a plurality of different medications, such as tablets and capsules and the like which must be taken by a patient at different periods of a day, and which can be used for a period in excess of a week under normal circumstances.

It is a further object of the present invention to provide a portable medication dispenser which includes a programmable controller for allowing medication to be dispensed at any given time over a period of a week or more such that dosages may be provided to a patient on a predetermined schedule.

It is also an object of the present invention to provide a medication dispenser which includes a plurality of sterilized containers for receiving different medications and which containers are appropriately retained in a dispensing mechanism in such a manner that the medication is made available to a patient on a predetermined schedule by entry of a sequenced timing program into a programmable timer or controller.

It is yet another object of the present invention to provide a medication dispenser for dispensing medications which must be administered to a patient in a predetermined time sequence and wherein access to the medications is controlled to prevent doubling of dosages in the event a patient does not take a medication within a predetermined period of time.

BRIEF DESCRIPTION OF THE DRAWINGS

The invention will be better understood with reference to the attached drawing figures wherein.

DESCRIPTION OF THE PREFERRED EMBODIMENT

Figure 2:
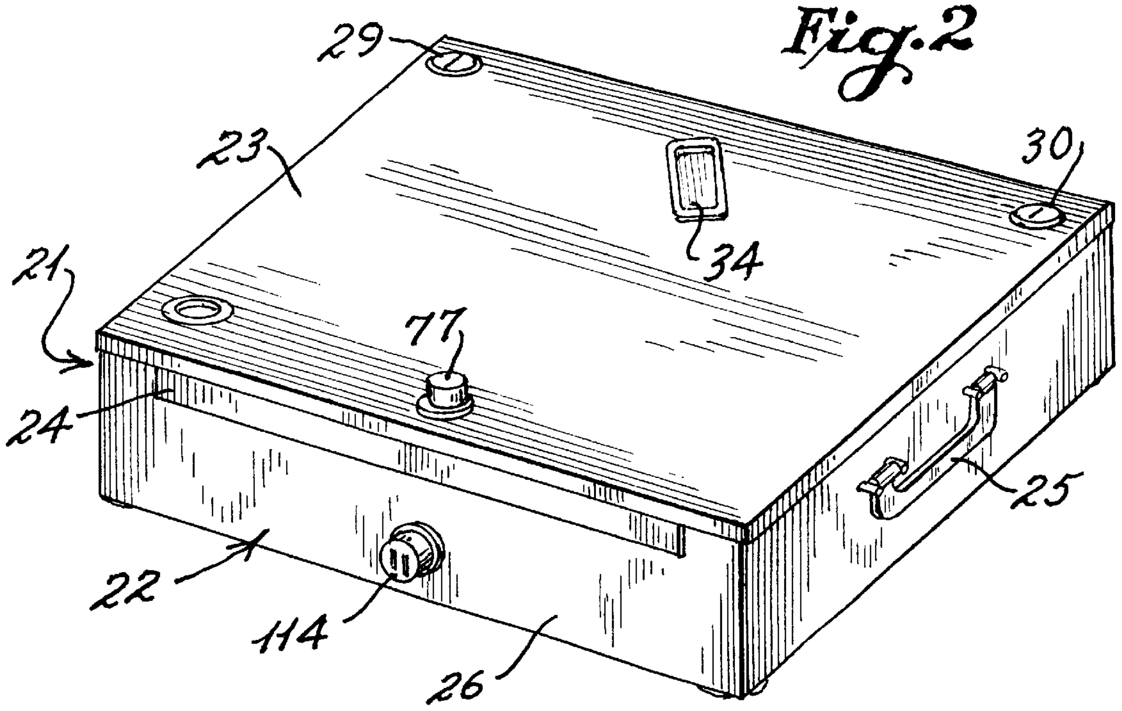
FIG. 2 is a rear perspective view of the dispenser shown in FIG. 1.

With continued reference to the drawing figures, the medication dispenser includes a portable carrying case 21 having a lower section 22 and a lid 23 which is pivoted to a rear wall 26 of the lower portion by way of a hinge assembly 24 (see FIG. 2). The carrying case 21 includes a carrying handle 25 which is mounted on a side wall 27 thereof. In some embodiments, two carrying handles may be associated with the carrying case. To prevent unauthorized access to medication which is contained within the dispenser, a pair of latches 29 and 30 are mounted along a front wall 28. Each latch includes a key lock.

Figure 1:
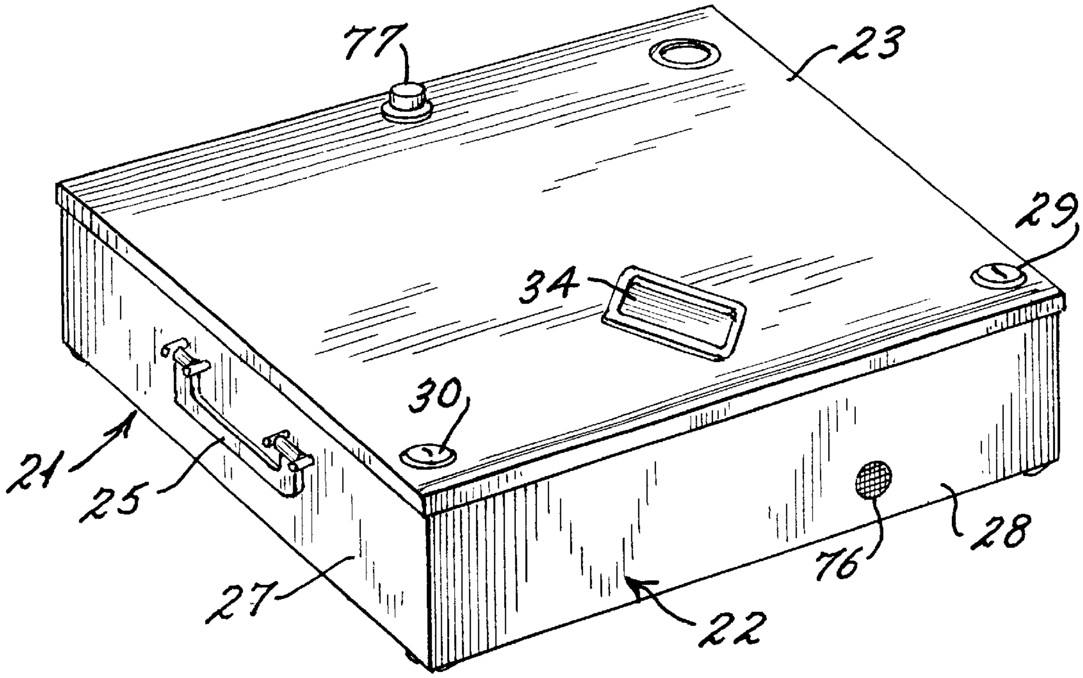
FIG. 1 is a front perspective view of the portable medication dispenser of the present invention showing the lid of the dispenser closed and locked to prevent unauthorized access to medication therein.
Figure 3:
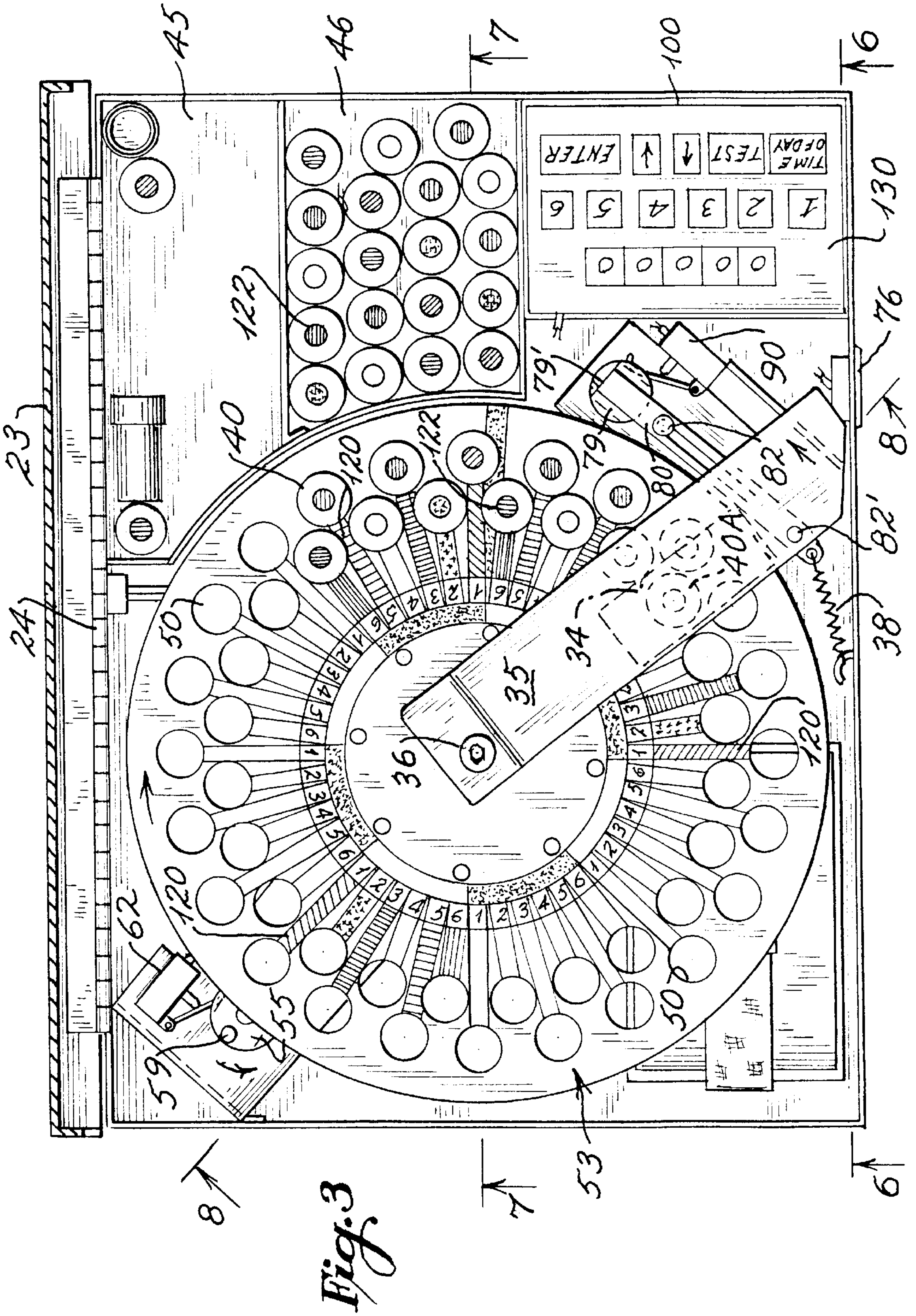
FIG. 3 is a top plan view of the dispenser of the present invention shown with the lid being fully open.
Figures 7, 9, 10, 11, 11A:
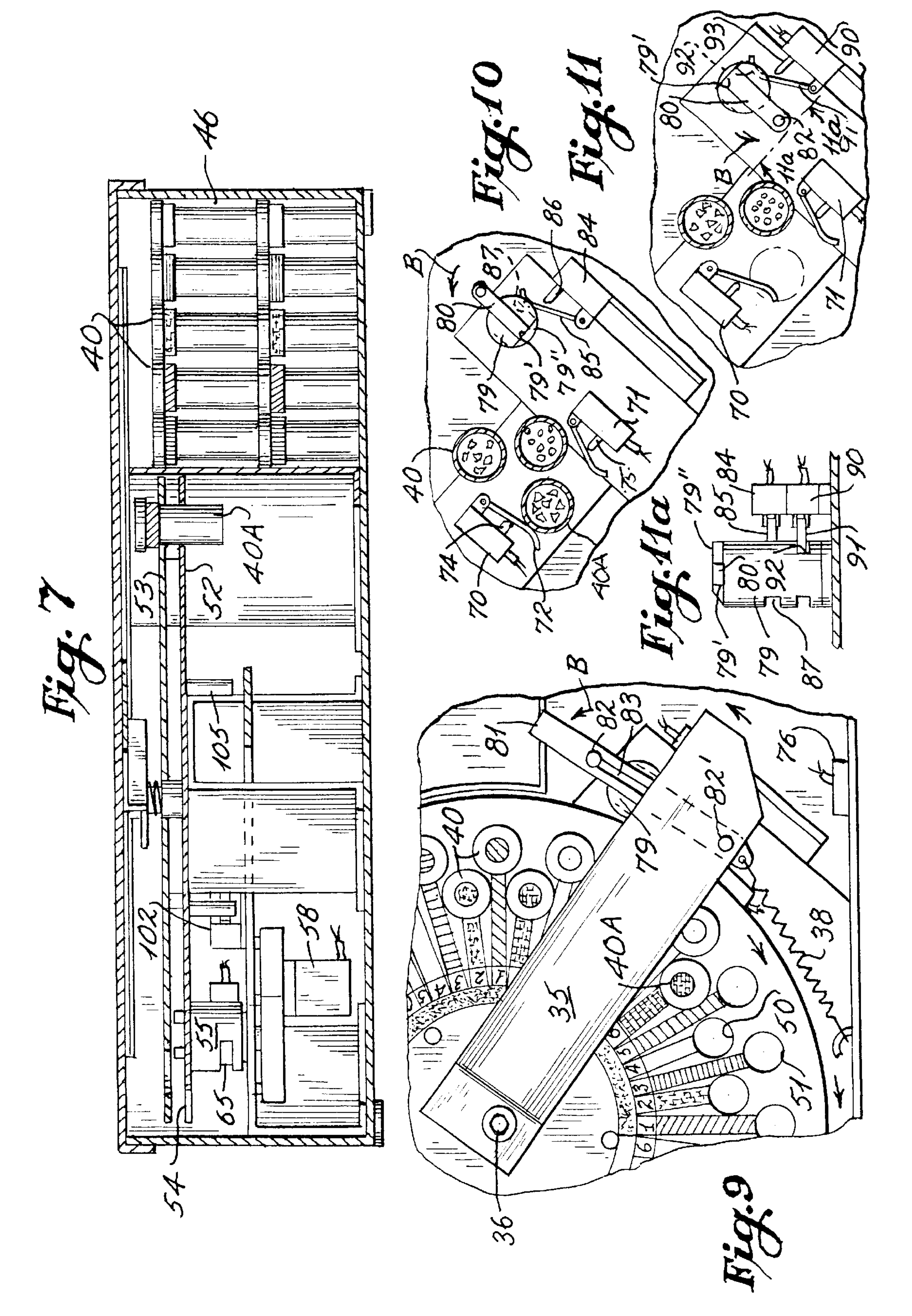
FIG. 7 is a cross-sectional view taken along line 7—7 of FIG. 3.
FIG. 9 is a partial top plan view of FIG. 3 showing the closure member moved to an open position.
FIG. 10 is a partial top plan view illustrating the switches for detecting when the medication dispenser closure member is moved to an open position.
FIG. 11 is a view similar to FIG. 10 after a medication container has been removed from the dispenser and the closure member returned to a closed position.
FIG. 11*a* is a view taken along lines 11*a*—11*a* of FIG. 11.

As shown in FIG. 1, a dispenser outlet opening 34 is provided through the lid and is normally covered by a pivotable closure member 35 (see FIG. 3) which is mounted about a pivot pin 36. A spring 38 is attached to the closure member so as to normally urge the closure member to a position to close the dispenser outlet opening 34, as is shown in FIG. 3. However, the closure member 35 is designed to be automatically pivoted to an open position, as shown in FIG. 9, as one of a plurality of medicine containers 40 are indexed to a position of alignment with the dispenser outlet opening 34, as will be described in greater detail. As a container 40A moves in the direction of the arrows shown in FIG. 8 to a position aligned with outlet opening, the closure member will be pivoted to an open position relative to the dispenser outlet opening 34. Once the container 40A is removed through the opening by a patient, the closure member is pivoted to the closed position of FIG. 3.

Figure 4:
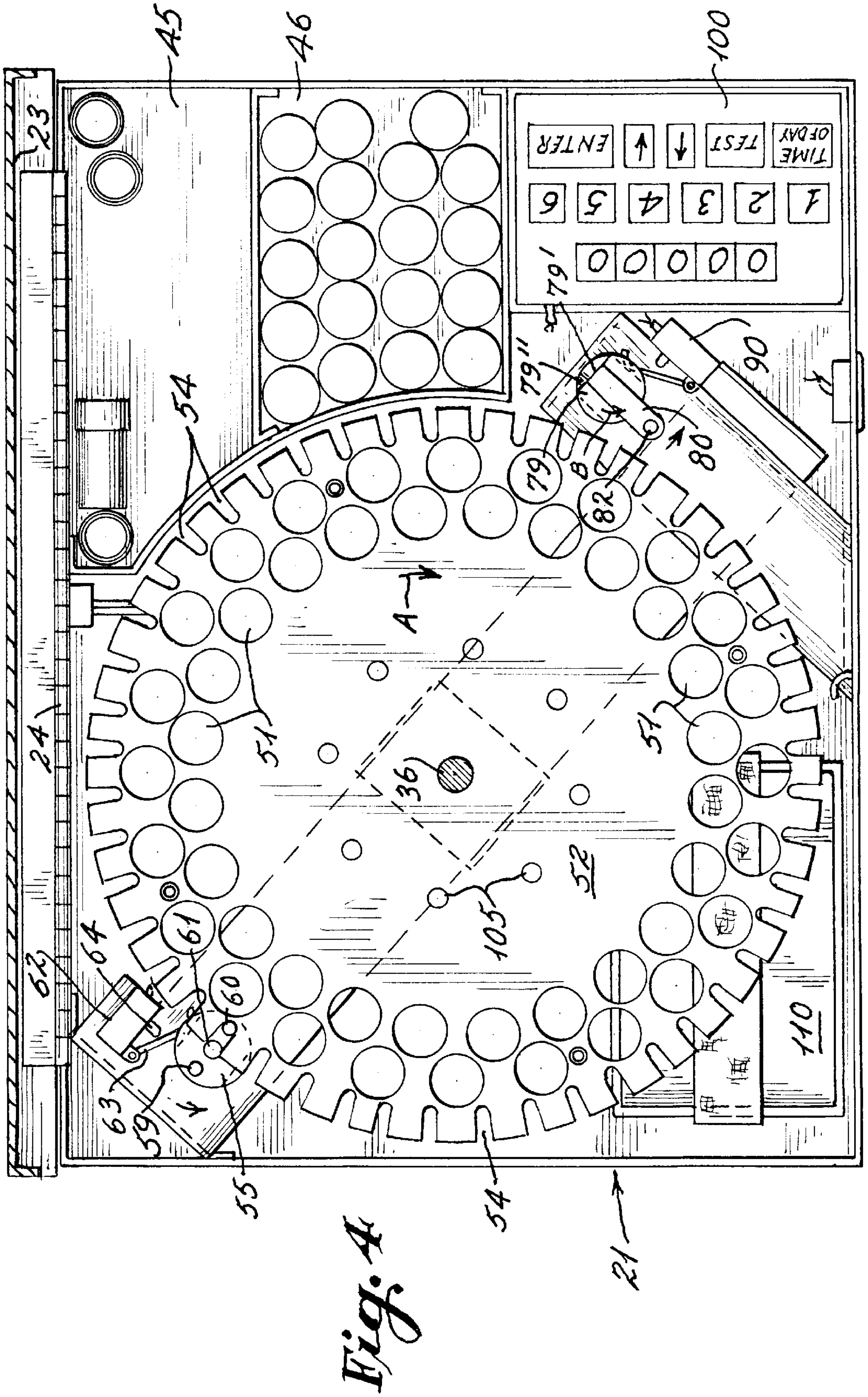
FIG. 4 is a view similar to FIG. 3 with the upper dispenser wheel and closure member of the present invention being removed.

As shown in FIGS. 3 and 4, a storage receptacle 45 is formed within the lower portion 22 of the carrying case 21. The receptacle is utilized to retain medication containers. Also shown in FIGS. 3 and 4, is a second storage receptacle 46 in which containers of medicine may be retained for selective use when filling the dispenser.

With particular reference to FIGS. 3–11 the medication containers 40 are designed to be retained within a plurality of vertically aligned openings 50 and 51 formed in an upper dispenser wheel 53 and lower indexing drive wheel 52. The wheels are connected and mounted to rotate together about a central pivot pin or bolt 36.

As shown in FIG. 3, in the preferred embodiment, 48 equally spaced openings 50, 51 are provided in the wheels adjacent the outer periphery thereof in two series of circular arrays. The embodiment disclosed is by way of example and the number of openings may vary and remain within the teachings of the present invention.

The number of openings is designed to allow up to at least six dosages to be made available in a pre-scheduled manner to a patient for each day of the week. Therefore, in the embodiment shown, there are six openings associated with each day. Further, the invention provides an additional six openings for retaining extra containers as a source of emergency medication in the event a medical technician cannot properly refill the dosage containers 40 and place them in the appropriate openings 50, 51 of the dispenser and drive wheels.

The outer peripheral edge of the drive wheel 52 is provided with a plurality of equally spaced grooves or notches 54 equal in number to the number of container openings 50, 51. In this manner, indexing of the wheel 52 in increments aligns one of the pair of openings 50, 51 with the dispenser outlet opening 34.

Figure 8:
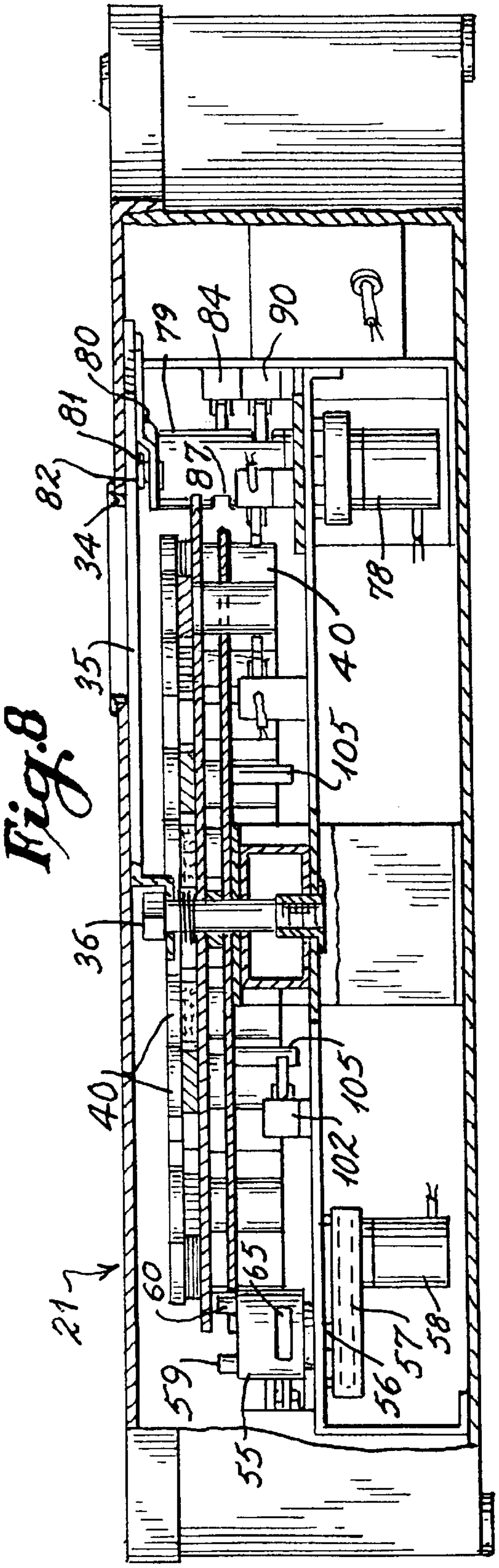
FIG. 8 is cross-sectional view taken along line 8—8 of FIG. 3.

With particular reference to FIGS. 3 and 8, the rotational movement of the dispenser wheel 53 and the indexing drive wheel 52 is accomplished by a rotary indexing drive mechanism 55 which is mounted to a drive spindle 56 which receives rotational energy from a gear reduction box 57 connected to indexing drive motor 58. The indexing drive mechanism 55 includes at least two generally equally spaced upwardly extending pins 59 and 60 which are of a size to be selectively received within the grooves 54 formed in the peripheral edge of the indexing wheel 52. In the position of the indexing mechanism 55 as shown in FIG. 4, the pin 60 is completely seated within a groove 54. If the motor 58 is not activated, the indexing mechanism 55 functions as a brake to prevent rotation of the indexing wheel 52 thus preventing tampering with the medication containers 40 by a patient turning the dispenser wheel and the indexing wheel by hand. It should be noted that both the pins 59 and 60 are offset with respect to the rotational axis 61 of the indexing mechanism by an equal distance. The indexing of the drive wheel 52 which is drivingly connected to the dispensing wheel 53 is controlled by a controller 100. The controller provides power to the motor 58 to activate the motor to rotate the indexing mechanism 55 about the drive axis 61 and in so doing will cause the pin 60 to rotate the wheels in the clockwise direction shown by the arrow "AA" in FIG. 4. During the indexing of the indexing drive mechanism through 180° the pin 59 will engage within the next adjacent slot 60 formed in the outer periphery of the indexing drive wheel 52. A switch 62 is mounted adjacent to the indexing mechanism 55 and includes a control arm 63 having an outer end engageable with a side body portion of the indexing member 55 which is utilized to control a contact switch 64 to deactivate the motor when the indexing mechanism has indexed one position thereby moving the containers 40 contained within the openings of the dispenser wheel and the drive wheel one position relative to the dispenser outlet opening. As shown, the indexing member 55 includes pairs of surface indents 65 which when in contacted by the control arm 63 of the switch 62 will allow the contact 64 to open thereby terminating power to the motor 58 and retaining the dispenser and drive wheels in the newly adjusted position. In the event there is no container provided in the next adjusted position the programmable controller 100 will, depending upon an internal timer, again initiate activation of the motor to continuing the indexing movement of the wheels until an opening in which a medication container 40 is received is aligned with the discharge outlet opening. A manual override switch "S" may be provided on the controller to power motor 58 to index the wheels.

With continued reference to FIGS. 3–5 and 9–11*a*, the manner in which the closure member 35 is operated to allow removal of an aligned medication dispenser 40A will be described in detail. In FIG. 3, the closure member 35 is shown as being in a closed and covering relationship with respect to the dispenser outlet opening 34 preventing withdrawal of the underlying medication dispenser 40A.

Figure 12:
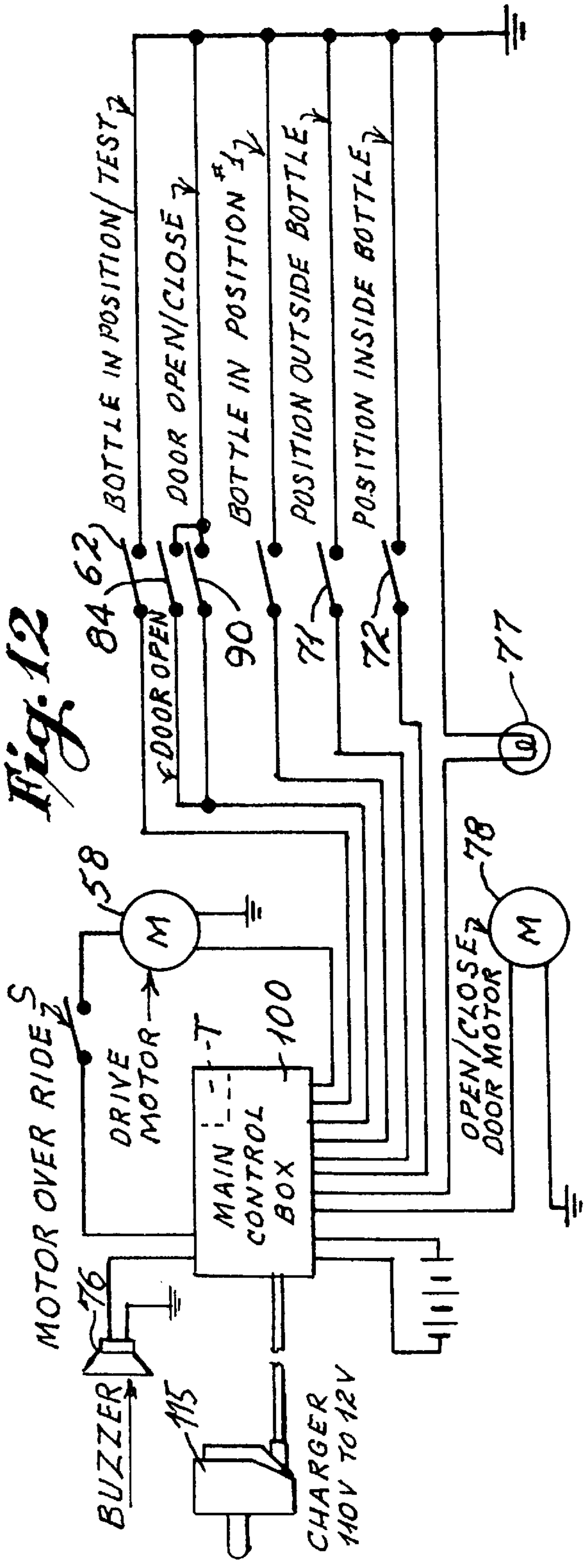
FIG. 12 is an electrical circuit diagram of the present invention.

In order to detect the presence of a container 40A in aligned position with respect to the discharge outlet opening 34, a pair of container contact switches 70 and 71 are provided having pivot arms 72 and 73, respectively, which are operable to close switch contacts 74 and 75 when the arms 72 and 73 are engaged by the container 40A. The switches 70 and 71 are connected, as shown in FIG. 12, to the programmable controller 100 and when closed by engagement of the container 40A will function to activate a buzzer 76 and a light source 77. The buzzer will be activated for a predetermined period of time as controlled by the programmable controller to give an audible indication that medication is to be taken. Likewise, the light 77 will be activated thereby giving a visual signal that medication is to be taken and that a medication container should be removed from the dispenser. In a preferred embodiment, the buzzer has a two tone output, one low pitch and one high, to ensure that the sound is heard. The buzzer will sound for a short period of time, such as five (5) seconds, with such sounds being generated at intervals, such as five (5) minutes.

The programmable controller is also electrically connected to a motor 78 for controlling the position of the closure member 35. The motor 78 is drivingly connected to rotate a control cam 79 which is secured to the output shaft of the motor and which controls the movement of a crank arm 80 connected to a linkage member 81 which is pivotally connected at 82 to the crank arm 80. The linkage member 81 has an elongated slot 83 therein which allows relative sliding movement of the linkage member 81 and the crank arm 80. The innermost end of the linkage member 81 is pivotally secured at 82' to the closure member 35. With the closure member in a closed position of FIG. 3, the crank arm 80, which is fixed to the cam, is positioned beneath the linkage member 81 extending toward the closure member 35. However, upon one of the container contact switches 70 and 71 being engaged, the controller will activate the motor 78 to drive the cam member 79 in a rotary motion thus rotating the crank arm 80 in a counterclockwise direction as shown in the drawing figures by arrows "B". The rotation of the cam member 79 and the crank arm 80 continues until the crank arm extends outwardly from the closure member 35 as shown in FIG. 10. In this position, a first closure member control switch 84 having a pivot arm 85 normally urged against the outer surface of the cam member 79 will engage a flat surface of the cam allowing the pivot arm to move away from a normally closed contact 86 thereby opening the switch 84 and closing power to the motor 78. Thereafter, the motor 78 will remain deactivated for a predetermined time to allow the patient to remove the medication container 40A from the dispenser and drive wheels through the outlet opening 34. A programmable controller will include an internal timing circuit which can be set or adjusted by a physician or other person having responsibility for operating the dispenser of the present invention. It is the functioning of the timer to allow an individual a predetermined amount of time such as a half-hour to a predetermined number of hours to access the medication carried within the container 40A. If, after that time, the container has not been removed, the motor 78 will be reactivated by the timer thus initiating a movement of the closure member 85 to the fully closed position as shown in FIG. 3. It is the purpose of the timer to prevent a patient from taking two doses in a close time sequence which could be extremely dangerous but allowing the patient sufficient time to obtain the medication even if the patient is not made aware by the buzzer 76 or the light 77 when the closure member initially opens allowing the dispensing of medication.

As shown in FIG. 11, once a patient removes the container 40A from the dispenser, the switch which was previously engaged by the container will reopen and thus the switch 70 of FIG. 11 is shown being moved to the open position. The programmable controller 100 will, after the predetermined time, initiate the operation of the motor 78 to rotate the cam 79 to thereby move the crank arm 80 and the link 81 connected thereto towards the closed position as shown in FIG. 11 and in FIG. 3. In some embodiments, activation of the motor 78 may be caused in direct response to the programmable controller sensing that the switch, such as shown at 70, is in an open position thus indicating that the receptacle 40A has been removed from the dispenser thereby allowing the selective closing of the closure member 35.

As the closure member 35 begins to move counterclockwise, as shown in FIG. 9, once the container 40A has been removed from the dispenser, the linkage member 81 will be pivoted counterclockwise, also as shown by the arrow "B" in FIG. 9. In the event any obstruction were to come between the closure member 35 and the opening 34 in the dispenser, the linkage member 81 will be allowed to slide relative to its pivot connection 82 with the crank arm 80 such that there would be a relative movement therebetween along the open channel 83 thus allowing the crank arm 80 to continue to rotate with the cam to a fully closed position, as is shown in FIG. 11, without further moving the closure member 35 to the closed position. The spring or other resilient member 38 secured to the closure member will, after the obstruction is removed, automatically pull the closure member such that the crank arm and linkage are realigned along the channel 83 permitting the full closure of the closure member relative to the outlet opening 34 in the dispenser. In this manner, a safety device is provided to ensure that a patient can not be injured by the closure of the closure member by operation of the motor 78.

Once the crank arm 80 moves to the fully closed position a pivot arm 91 of a second detection switch 90 will engage within a flat 92 in the cam surface thereby opening contact 93 associated with the switch and thereby deactivating the drive motor 78.

To prevent unauthorized tampering and opening of the closure member after it has been closed, the upper surface of the control cam 79 includes a ledge 79' which will abut the linkage member 81 to prevent it from being rotated by any force applied to open the closure member. The ledge extends as shown in FIGS. 3 and 4. An inclined surface 79", see FIG. 11*a*, extends from the ledge to lift the member 81 when the cam 79 is rotated by the motor 78.

Figure 5:
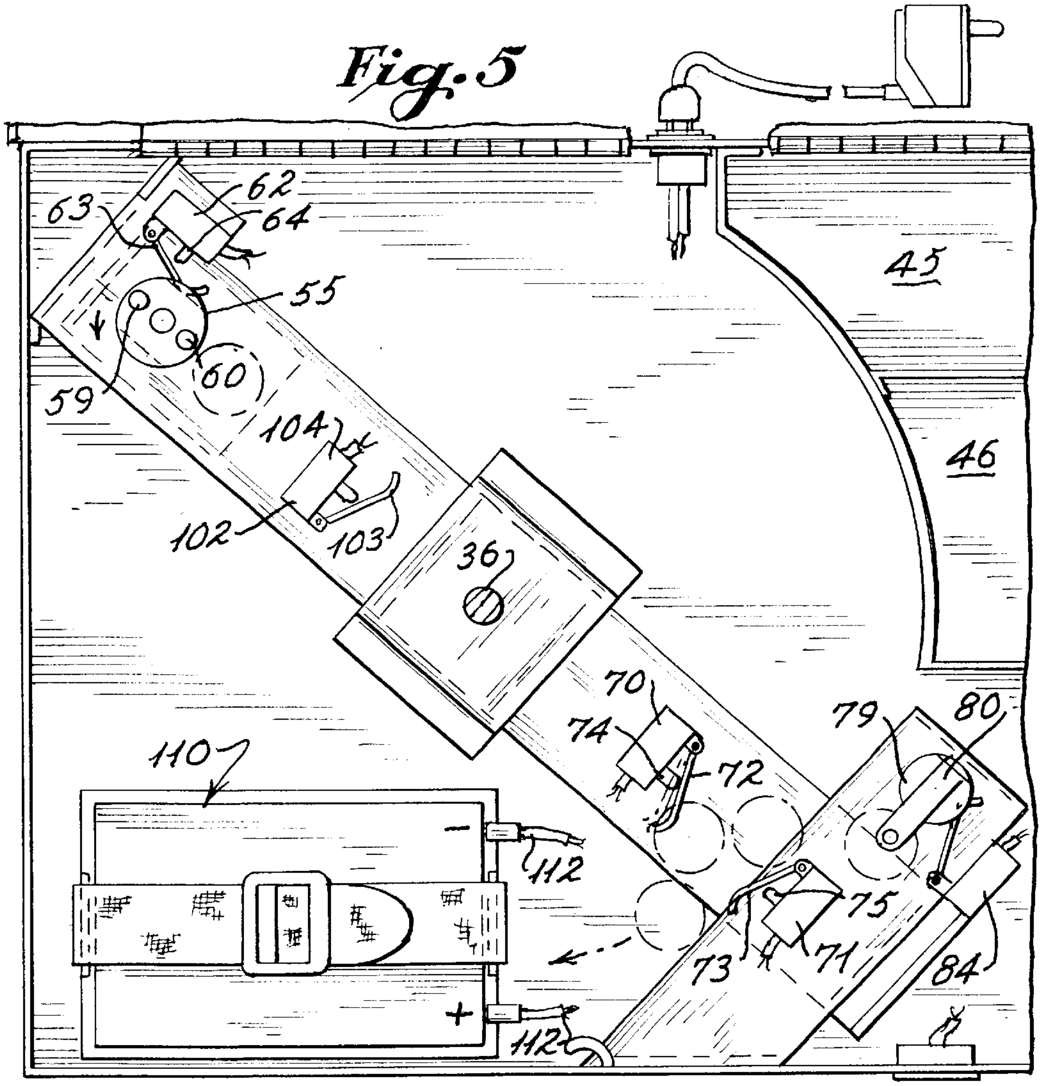
FIG. 5 is an enlarged partial top plan view taken with the indexing drive wheel of FIG. 4 removed showing the control switches of the invention.
Figure 6:
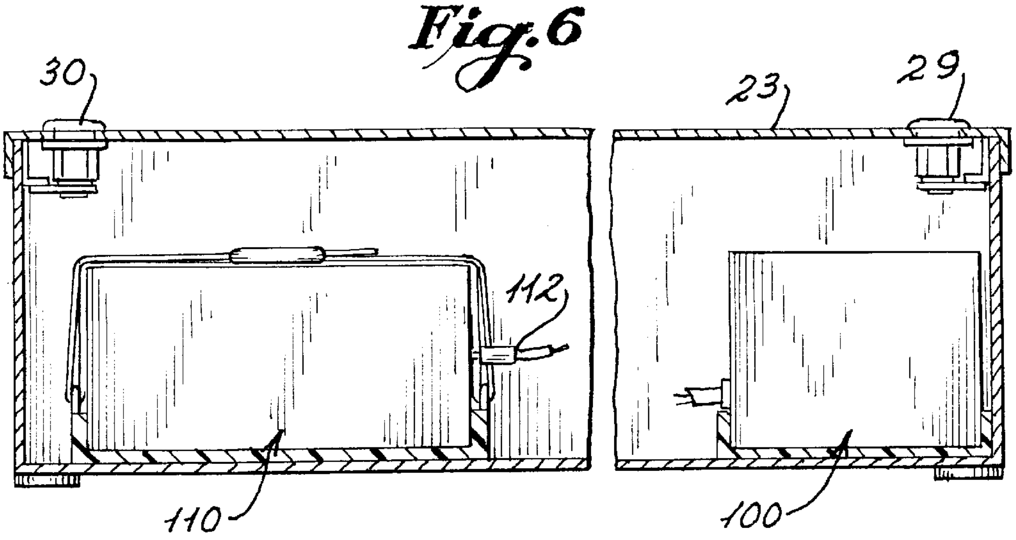
FIG. 6 is a partial cross-sectional view taken along line 6—6 of FIG. 3.

With particular reference to FIGS. 4, 5 and 8, the preferred embodiment of the present invention may also include a switch for detecting the beginning of each day of medication. In this respect, a switch 102 is mounted within the dispenser and below the indexing wheel 52. The switch includes a pivot arm 103 and a contact 104. The pivot arm is engageable by one of eight posts or actuators 105 which are mounted to and depend from the indexing wheel 52. As the indexing wheel rotates, when one of the activators 105 contacts the pivot arm 103 of the switch 102, the normally contact 104 will be closed thereby giving an immediate indication to the programmable controller that the initiation of the next days medication has begun.

As previously described, the present invention could be operated on both conventional AC current or with a backup battery supply. In the preferred embodiment shown, the dispenser is designed to be powered by an internal battery 110 which is rechargeable. Therefore, internal wiring 112 is provided to an outlet 114 from which a suitable charger 115 can be connected for converting AC power for purposes of charging the battery 110.

To further facilitate the safe dispensing of medications from the dispenser of the present invention, the dispenser wheel 53 may be provided with a plurality of indicator areas 120 which extend outwardly relative to the openings for the containers 40. The indicator areas may be color-coded are provided with other indicia which is utilized to match with indicia or color-coding provided along the upper surface of the medication containers, as shown at 122 in drawing FIG. 3. In this manner, an individual, such as a nurse, having responsibility to place medication in the medication containers 40, can match by color coding or by matching indicia the proper containers of medication with each of the proper openings in the dispenser wheel 53.

The main controller also includes circuitry for controlling the various times medication is to be dispensed to be programmed therein by utilizing a control panel 130 provided interiorly of the dispenser. By entering proper codes, the times for dispensing medication can be set for each day of the eight day period provided by the dispenser of the present invention.

As previously discussed, in some instances, the controller will cause the indexing mechanism to move the indexing drive wheel in a number of consecutive increments especially where medication is only contained within a single container for each day. In such instances, the actuator will be operable to cycle through six movements of the ratchet drive wheel to consecutively align a single container for one day with a dispenser outlet and then, at a proper time, advance the wheel to align another container for the subsequent day. Therefore, the times of day as well as the number of containers to be aligned with the dispenser opening will be suitably controlled by the programmable controller.

In use of the medication dispenser of the present invention, a doctor, nurse or other qualified medical technician or, in some instances, a patient, family member or friend, will fill the sterilized containers with the predetermined medications which are to be taken by the patient. Any number of pills, capsules or other medications may be placed in a single container. The containers are then closed and are placed in appropriate openings 50, 51 within the drive and dispenser wheels 52, 53. The number of containers 40 utilized will depend on the patient's required medication. Thereafter, the programmable controller will be programmed to control when each of the containers will be brought into alignment with the dispenser outlet. Such programmed information will control the operation of the indexing motor and the number of indexing steps at the appropriate times of day. As medication becomes due, the programmable controller will cause current to flow to the indexing motor thereby activating the motor and indexing the wheels one position. The number of indexing steps will depend upon the number of medications to be taken daily.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

I claim:

1. A medication dispenser for dispensing doses of medication to a patient on a predetermined schedule, the dispenser including a carrying case having a dispenser outlet opening therein, a first wheel element mounted within said carrying case, a plurality of openings formed in said first wheel element in spaced relationship with respect to one another, indexing means mounted within said carrying case to rotate said first wheel element so as to incrementally align said plurality of openings relative to said dispenser outlet opening, a programmable controller mounted within said carrying case and electrically connected to said indexing means whereby said programmable controller controls an incremental movement of said first wheel element based upon a predetermined time schedule, means for connecting said programmable controller to a source of electrical power, a plurality of medication containers adapted to be selectively positioned within said plurality of openings of said first wheel element for receiving doses of medication to be supplied to a patient on a predetermined schedule, means for determining when one of said containers is aligned with said dispenser outlet opening, a closure member for normally closing said dispenser outlet opening when said closure member is in a first position, and means electrically connected to said programmable controller to move said closure member to a second position to open said dispenser outlet opening for a predetermined time when said one of said containers is aligned with said dispenser outlet opening and thereafter initiate movement of said closure member toward said first position.

2. The medication dispenser of claim 1 including means mounted within said carrying case for signaling an individual when one of said medication containers which is seated within said one of said plurality of openings in said first wheel element should be removed through said dispenser outlet opening from said carrying case.

3. The medication dispenser of claim 2 in which said means for signaling includes an audible element mounted within said carrying case, said means for determining including at least one first switch means mounted adjacent said dispenser outlet opening and electrically connected to said audible element, said at least one first switch means including means for engaging one of said medication containers as it moves into alignment with said dispenser outlet opening to thereby cause power to be applied to said audible element.

4. The medication dispenser of claim 3 in which said means for signaling includes a visual indicator mounted to said carrying case and electrically controlled in response to said at least one first switch means.

5. The medication dispenser of claim 4 in which said indexing means includes a second wheel element having a plurality of equally spaced recesses formed in a peripheral edge thereof, a plurality of openings provided in said second wheel element and aligned with said plurality of openings in said first wheel element, and said indexing means including a rotary driver driven by a motor for engaging in said recesses to incrementally rotate said first and second wheel elements within said carrying case.

6. The medication dispenser of claim 5 wherein said rotary driver includes at least two spaced vertically extending pins moveable about a rotational axis of said rotary driver and being of a size to be received within said recesses.

7. The medication dispenser of claim 6 including switch means mounted adjacent said rotary driver for controlling said motor to stop a rotational movement of said rotary driver.

8. The medication dispenser of claim 7 in which said indexing means includes a drive connection between said motor and said driver.

9. The medication dispenser of claim 1 including, resilient means for urging said closure member toward said first position closing said dispenser outlet opening.

10. The medication dispenser of claim 9 in which said means electrically connected to said programmable controller to move said closure member includes a second motor having a drive output, a crank member mounted to said drive output, a linkage member pivotally connected at one end thereof to said crank arm and pivotally connected to said closure member at an opposite end thereof.

11. The medication dispenser of claim 10 including an elongated slot in said linkage member, and a pivot pin extending through said slot and connecting said linkage member with said crank member.

12. The medication dispenser of claim 11 in which said drive output of said second motor is connected to a rotary cam, switch means for determining the position of said rotary cam to electrically deactive said second motor when said cam is sensed in a position to cause said closure member to be either in said first position or said second position thereof.

13. The medication dispenser of claim 1 including first and second circular series of said plurality of openings formed in said first wheel element, and first and second switch means mounted within said carrying case adjacent each of said series of openings for contact by a container carried in said openings when a container aligns with said outlet opening in said carrying case.

14. The medication dispenser of claim 1 wherein an upper surface of said first wheel element includes a plurality of differing codings thereon adjacent said plurality of openings therein, and said plurality of medication containers having codings thereon which match the differing codings on said upper surface of said first wheel element whereby said plurality of containers are placed in said plurality of openings in said first wheel element adjacent matching codings.

15. The medication dispenser of claim 1 in which a number of said plurality of openings in said first wheel element is sufficient to retain said plurality of said medication containers for each day of a week, and an additional plurality of openings in said first wheel means for supporting additional medication containers as a source of emergency supply.

16. The medication dispenser of claim 1 wherein said carrying case includes a lid and a lower section, and means for locking said lid to said lower section of said carrying case.

17. The medication dispenser of claim 1 in which said means for connecting said programmable timer to a source of electrical power includes a rechargeable battery mounted within said carrying case and means for connecting said battery to an AC power circuit.

18. A medication dispenser for dispensing doses of medication to a patient on a predetermined schedule, the dispenser including a carrying case having a dispenser outlet opening therein, a first wheel element mounted within said carrying case, a plurality of openings formed in said first wheel element in spaced relationship with respect to one another, indexing means mounted within said carrying case to rotate said first wheel element so as to incrementally align said plurality of openings relative to said dispenser outlet opening, a programmable controller mounted within said carrying case and electrically connected to said indexing means whereby said programmable controller controls an incremental movement of said first wheel element based upon a predetermined time schedule, means for connecting said programmable controller to a source of electrical power, a plurality of medication containers adapted to be selectively positioned within said plurality of openings of said first wheel element for receiving doses of medication to be supplied to a patient on a predetermined schedule, means for generating a signal to an individual when one of said containers is aligned with said dispenser outlet opening, a closure member for normally closing said outlet opening when in a first position, means for moving said closure member to a second position to open said outlet opening when one of said plurality of containers is aligned with said dispenser outlet opening such that said one of said plurality of containers can be removed from said carrying case, and means for moving said closure member toward said first position to thereby close said container outlet opening.

19. The medication dispenser of claim 18 in which said means for moving said closure member to said second position includes means for retaining said closure member in said second position for a predetermined time and for automatically initiating movement of said closure member toward said first position after the predetermined time has elapsed to thereby prevent further access to said one of said plurality of containers if not previously removed through said dispenser outlet opening.

20. The medication dispenser of claim 18 in which said means for moving said closure member includes a motor connected to said closure member by a mechanical linkage, said mechanical linkage providing lost motion between said motor and said closure member if said closure member encounters an obstruction while being moved toward said first position to thereby prevent said motor from providing a closure force to move said closure member to said first position.

* * * * *